April 30, 1963   L. C. MORTON   3,087,529
ADAPTER WASHER FOR TIRE VALVES
Filed Dec. 10, 1959

INVENTOR.
LESTER C. MORTON
BY Kenyon & Kenyon
ATTORNEYS

United States Patent Office 3,087,529
Patented Apr. 30, 1963

3,087,529
ADAPTER WASHER FOR TIRE VALVES
Lester C. Morton, Trumbull, Conn., assignor to National Distillers and Chemical Corporation, a corporation of Virginia
Filed Dec. 10, 1959, Ser. No. 858,629
1 Claim. (Cl. 152—427)

This invention relates to an improvement in vehicle tire tubes. More particularly, this invention relates to a washer which is adapted to be fit into a tire rim hole which is substantially larger than the diameter of the shank of a tire tube valve which is to be inserted in the rim hole.

In the past decade, tremendous strides have been made in the automotive industry, particularly with regard to engineering accomplishments and styling. For many years the automotive industry used a standard 16-inch diameter tire rim with a standard .625-inch diameter rim hole on passenger car wheels. Among the many changes which have taken place in the automotive industry in the past few years is the advent of the 14-inch diameter tire rim on passenger cars. In using these 14-inch tire rims, the manufacturers found it necessary to reduce the tire rim hole for the tire valve from .625 to .453 inch and at the present time the automobile manufacturers are making both size tire rims. In view of this dual rim hole size, the tire manufacturers have found it expedient to use a standard tire valve in order that a single valve might be put on a tube to fit a given tire size, whether the tire were mounted on a rim having a .453 rim hole or a 625 rim hole. In order to achieve this standardization it became necessary for the tire manufacturer to employ a valve with a smaller diameter shank on the tube than had heretofore been used. In doing this, however, numerous difficulties were encountered with the tire tube. Foremost among these difficulties was the fact that the tube extruded from the rim hole when a .625 rim hole was used so that in many cases the tube would be cut on the metal edge of the rim, thereby causing blowouts with the attendant safety hazards.

It is the primary object of this invention to provide a means for allowing a smaller diameter tire tube valve to be used with a tire rim having a substantially larger rim hole.

It is another object of this invention to provide a means for preventing the tire tube from extruding from the rim hole.

It is another object of this invention to provide a means for increasing automobile safety by substantially reducing the number of blowouts due to the tire tube being cut by the tire rim.

These and other objects of this invention will be apparent from the following description.

According to this invention there is provided an adapter washer which is adapted to fit into a tire rim hole which is substantially larger than the diameter of the shank of a tire tube valve which is to be inserted in the rim hole. In the preferred embodiment of this invention the adapter washer is fit into a tire rim hole and is adapted to fit around the valve shank and between a portion of the tire tube and the tire rim so that a tube having a valve with a small diameter shank may be used with a tire rim having a rim hole substantially larger than the diameter of the valve shank.

The adapter washer of this invention is made from a resilient, flexible material that is strong enough to prevent the tube from extruding and at the same time will not cut the tube. A washer made from a plastic such as polyethylene has been found to be highly desirable since it is flexible enough to snap into the rim hole, strong enough to prevent the tube from extruding and at the same time will not cut the tire tube.

The construction of the adapter washer is such that it will fit into the tire rim hole snugly and take up any space between the tire valve and the rim when the tire valve is inserted into the rim hole. The washer is preferably round although its shape and dimensions may be adapted such that it can be used in any instance where there is a considerable difference between the size of the tube valve and the size of the rim hole.

The adapter washer of this invention will henceforth be described and illustrated in connection with a tire rim having a rim hole of .625 inch in diameter and a tire tube valve having a shank substantially smaller such that it will fit both a .625 inch rim and a .453 inch rim. This description is illustrative only as obviously many modifications as to size and shape in the washer may be made by those skilled in the art and applicants intend only to be bound by the spirit and scope of the appended claims.

For a more detailed description of this invention reference should be had to the following description and drawings in which.

Figure 1:
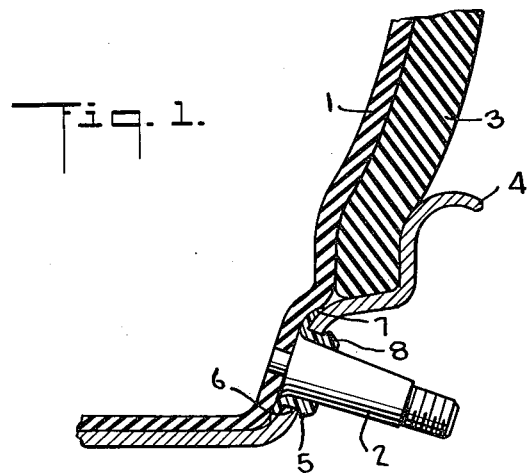
FIGURE 1 is a cross-sectional view of the adapter washer assembled between the tire tube and the tire rim.

Referring now to FIGURE 1, for an assembled side view of the wheel components, it will be seen that tire 3 rests on rim 4. Tube 1 has attached thereto tire valve 2. Adapter washer 5 fits into a hole in rim 4 and is constructed such that its bottom portion has an outwardly extending flange which fits between a portion of the tube 1 and the bottom of rim 4. The top of washer 5 has a slightly outwardly extending flange which extends out and over the top of rim 4. The shank of the washer, that is, the portion substantially between the top and bottom flanges, is in the form of an annular ring. Due to the flexibility of the material from which the washer is made, the annular ring attaches the adapter washer firmly to rim 4.

Figure 2:
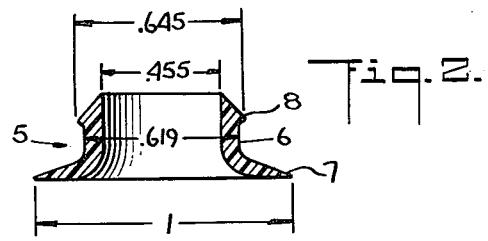
FIGURE 2 is a cross-sectional view of the adapter washer prior to assembly.

For a more detailed view of adapter washer 5, reference should now be had to FIGURE 2. In this figure, the washer is illustrated particularly with reference to its use in a standard 16-inch diameter tire rim having a .625 inch rim hole. It will be seen that the washer has outwardly extending flanges 7 on its bottom portion and a slight outwardly extending flange 8 on its upper portion so as to form an annular ring 6 of its body portion. During assembly, since the washer is made of a flexible material, the washer snaps onto the tire rim such that the edge of the rim is disposed around the ring 6 with the upper and lower flanges of the washer extending over the edges of the tire rim. The tire valve is then forced into the hole in the adapter-washer. When changing tire-tubes, the valve is extracted from the washer and the washer remains in the rim. The bottom flange 7 is relatively long and relatively thin, its width tapering to a point so that it becomes extremely flexible at its outer limits and will follow the inside contours of rim 4. This wedge shaped design of flange 7 provides as smooth a juncture as is possible between the rim 4 and the tire tube 1, thus decreasing the chance of pinching the tube 1 or of creating a point of stress where the tire tube 1 would otherwise have to bridge a substantial air gap between the tire tube 1 and the rim 4.

When the washer is to be used in connection with a standard .625 rim hole, the bottom diameter of the washer at the outermost ends of flange 7 is about 1 inch. The outer diameter at the ends of the upper flanges 8 is about .645 inch and the outer diameter of the annular ring is about .618 inch. The inner diameter of the washer is about .455 inch for substantially its entire length and fits snugly around tube valve 2. Obviously as the rim hole increases or decreases, or as the valve shank increases or decreases, the washer dimensions will be changed so that it will at all time fit snugly between the valves and rim 4.

Figure 3:
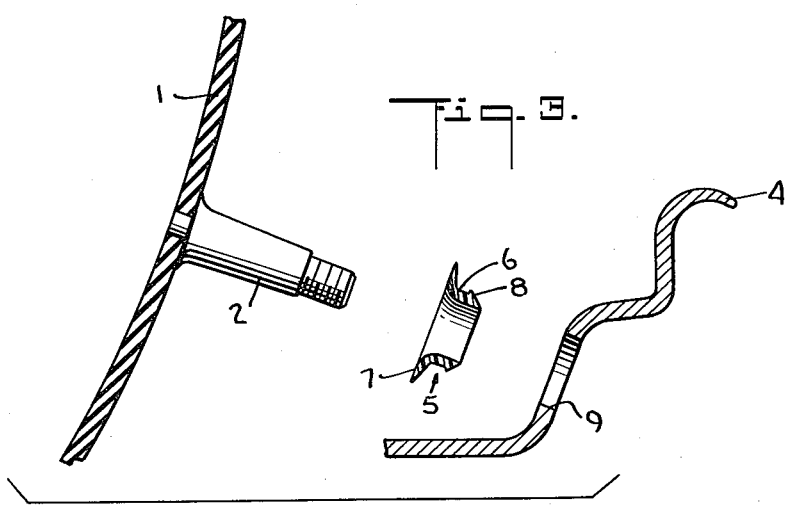
FIGURE 3 is a cross-sectional view of the tire tube, adapter washer and rim prior to assembly.

Referring now to FIGURE 3 for a detailed view of the wheel components prior to assembly, it will be seen that tire tube 1 has attached thereto tire valve 2, the diameter of whose shank is smaller than the rim hole 9 of tire rim 4. Adaptor washer 5 is constructed of a flexible material such that as it is forced through rim hole 9, the washer snaps into hole 9 and is held firmly in place by its annular ring 6 and by bottom flanges 7 and upper flanges 8. Generally, the washer must be forced through hole 9 because the diameter of its upper flanges is slightly larger than the diameter of the rim hole. The tire valve is then forced into the hole in the washer. In its assembled form, the washer is held firmly in place and thereby prevents the tube 2 from extruding through rim hole 4, thereby eliminating blowouts due to rim cuts.

The particular constructions here shown, while presently believed to be the best forms of device now known for the intended purpose, are set forth for purposes of illustration only, and not with any intention of limiting the invention, whose scope is set forth in the claim appended hereto.

What is claimed is:

In combination a wheel rim having a valve hole therein, a pneumatic tire on said rim, an inner tube disposed within said tire including a valve member having a shank portion being of substantially smaller diameter than said rim hole extending through said rim hole, and a resilient adapter washer of circular configuration having a neck portion fitting snugly around said shank portion and fitting snugly into said rim hole, said washer having an integral circular bottom flange on said neck portion disposed between said inner tube and said rim tapering to a relatively thin resilient edge providing a smooth juncture between said inner tube and the inner surface of said rim without distortion of said inner tube at said juncture, and a bevelled flange of smaller diameter than said bottom flange at the outer end of said neck portion having a lip portion engaging the outer face of said rim adjacent said rim hole and retaining said washer and said valve member therein.

References Cited in the file of this patent

UNITED STATES PATENTS

| | | |
|---|---|---|
| 1,573,730 | Mays | Feb. 16, 1926 |
| 1,728,825 | Green | Sept. 17, 1929 |
| 1,931,649 | Eger | Oct. 24, 1933 |
| 2,968,333 | Ayres | Jan. 17, 1961 |

FOREIGN PATENTS

| | | |
|---|---|---|
| 739,529 | Great Britain | Nov. 2, 1955 |